Jan. 22, 1963 R. J. KINKAID 3,075,167

PANEL CONNECTOR WITH FLAG-TYPE TERMINALS

Filed June 22, 1960 2 Sheets-Sheet 1

INVENTOR.
ROBERT J. KINKAID
BY
Curtis, Morris + Safford

INVENTOR.
ROBERT J. KINKAID
BY
Curtis, Morris & Safford

United States Patent Office 3,075,167
Patented Jan. 22, 1963

3,075,167
PANEL CONNECTOR WITH FLAG-TYPE TERMINALS

Robert J. Kinkaid, Harrisburg, Pa., assignor to AMP Incorporated, Harrisburg, Pa.

Filed June 22, 1960, Ser. No. 38,022
10 Claims. (Cl. 339—176)

This invention relates to electrical connecting devices for forming disengageable electrical connections between a plurality of conductors on a rigid panel-like member, such as a printed circuit board, and a corresponding number of wires external to the panel. The invention is herein disclosed and described in a particular embodiment intended specifically for a printed circuit board, however, it will be apparent that the invention is amenable to usage with other panel-like members having conductors thereon.

The widespread adoption of printed circuit techniques has created a need for connecting devices capable of disengageably connecting external conductors to the conducting paths on the printed circuit board. One type of connector which has been developed to fill this need comprises a dielectric block having a trough therein for reception of an edge portion of the printed circuit board and having mounted in the trough a plurality of connecting devices or contacts which engage the conducting paths on the board when the board is inserted into the trough. These contacts in the trough are in turn secured, as by crimping, to the external conductors or wires which extend from the back of the block, (i.e. the side of the block which is opposite to the face in which the trough is provided). Connectors of this general type are satisfactory in most respects but they suffer from several disadvantages and are ill-suited for usage under certain conditions in which printed circuit boards must be disengageably connected to external conductors. One disadvantage of this known type of connectors is that since the wires extend from the side of the block which is opposite to the side in which the trough is provided, and into which the printed circuit board is inserted, there is a tendency on the part of a technician removing the block from the board to grasp the external wires and pull on them to effect disengagement. This imposes a severe strain on the wires and on the contacts and may cause them to be damaged so that they cannot perform their intended function. The preferred method of disengaging a connector from a board is by grasping the dielectric block itself and separating the board from the block. However, these blocks are often so small that the technician is tempted to grasp the more readily available and more easily handled wires which extend from the block. A further disadvantage of these prior art connectors is that since the external wires extend from the side of the block which is opposite to the side in which the trough is provided, they are disposed in the plane of the printed circuit board when they leave the board. Many circuit arrangements require that the wires extend normally of the board and with a prior art connector then the wires must be bent at a point adjacent to the board. Such bending of the wires is also a possible source of damage to the wires themselves or to the connectors.

It is accordingly an object of the present invention to provide an improved connecting device for printed circuit boards or the like. A further object is to provide a connector for printed circuit boards in which the external conductors or wires extend from the connector block normally of the plane of the board. A still further object is to provide a connector device which is constructed in a manner such that careless handling of the connector during removal thereof from the printed circuit board is rendered impossible or at least impractical and is thereby discouraged. A still further object is to provide an improved connector in which the contacts can be assembled to the connector block by a simple insertion operation and which provides means for retaining the contact or terminal in the block but which permits intentional removal of the contact when necessary.

These and other objects of the invention are achieved in a preferred embodiment comprising a dielectric block having on one side thereof an elongated trough for the reception of an edge portion of a printed circuit board. A plurality of slots are provided in the block and extend inwardly thereof from the one side in which the trough is provided and also inwardly from an adjacent side of the block so that these slots intersect the trough and define, on the opposite side walls thereof, laterally extending recesses for the reception of the terminals or contacts. The root portions of the slots which open into the adjacent side of the block are enlarged and are adapted to receive flag-type terminals having a pair of laterally extending arms. The external wires with the terminals on their ends can thus be inserted into the block from the adjacent side until the laterally extending arms of the terminals are disposed in the recesses which border the sidewalls of the trough. The arms of the terminals are spaced apart by a distance slightly less than the width of the trough so that portions of these arms normally project into the trough itself. Upon insertion of an edge portion of the printed circuit board into the trough, these arms are pushed apart and are resiliently held against the conducting paths on the printed circuit boards with which they make contact. Since the wires extend from a side of the dielectric block which is adjacent to the side in which the trough is provided, there is absolutely no temptation, when a block is being removed from the edge of a board, to pull upon these wires to effect such removal. The operator rather is inclined to grasp the block itself and exert a pull directly on the block. This mode of removal is facilitated and encouraged by the fact that the ends of the block are unobstructed and the wires extend in a direction such that they do not interfere with the operation.

In the drawing:

FIGURE 3 is a perspective view of a terminal of the type intended for usage in the disclosed block.

FIGURE 3A is a view similar to FIGURE 3 but showing the terminal in its uncrimped condition.

FIGURE 8 is a sectional view looking in the direction of the arrows 8—8 of FIGURE 4.

Figures 1, 2, 6, 7, 7A:
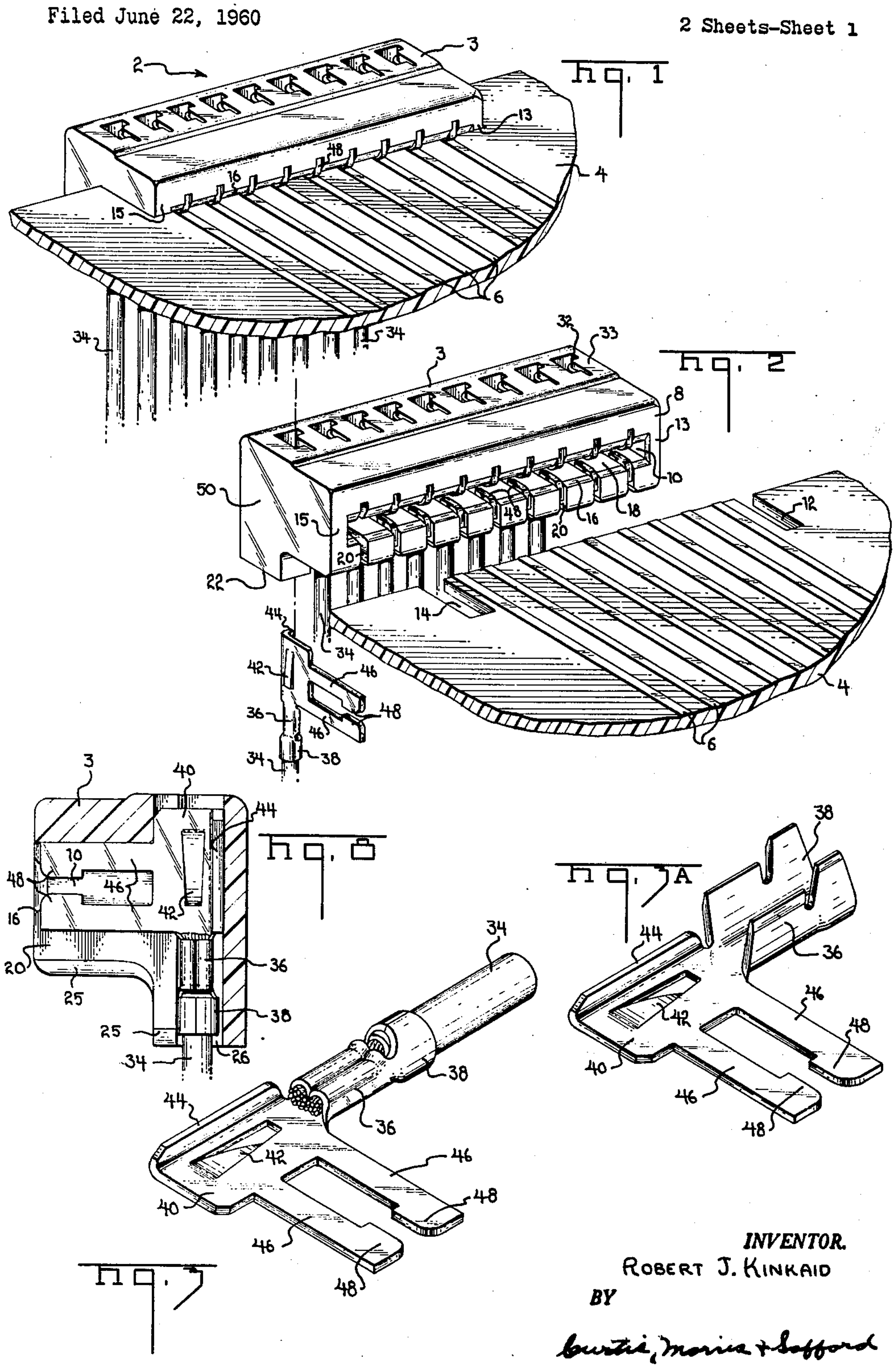
FIGURE 1 is a perspective view showing a connector in accordance with the invention in assembled relationship to an edge portion of a printed circuit board.
FIGURE 2 is a view similar to FIGURE 1 but showing the connector separated from, but aligned with, the board.
FIGURE 6 is a perspective view looking at the cross-section of the block indicated by the arrows 6—6 of FIGURE 4.
FIGURE 7 is a view similar to FIGURE 6 but looking in the direction of the arrows 7—7 of FIGURE 3.
Figures 4, 5:
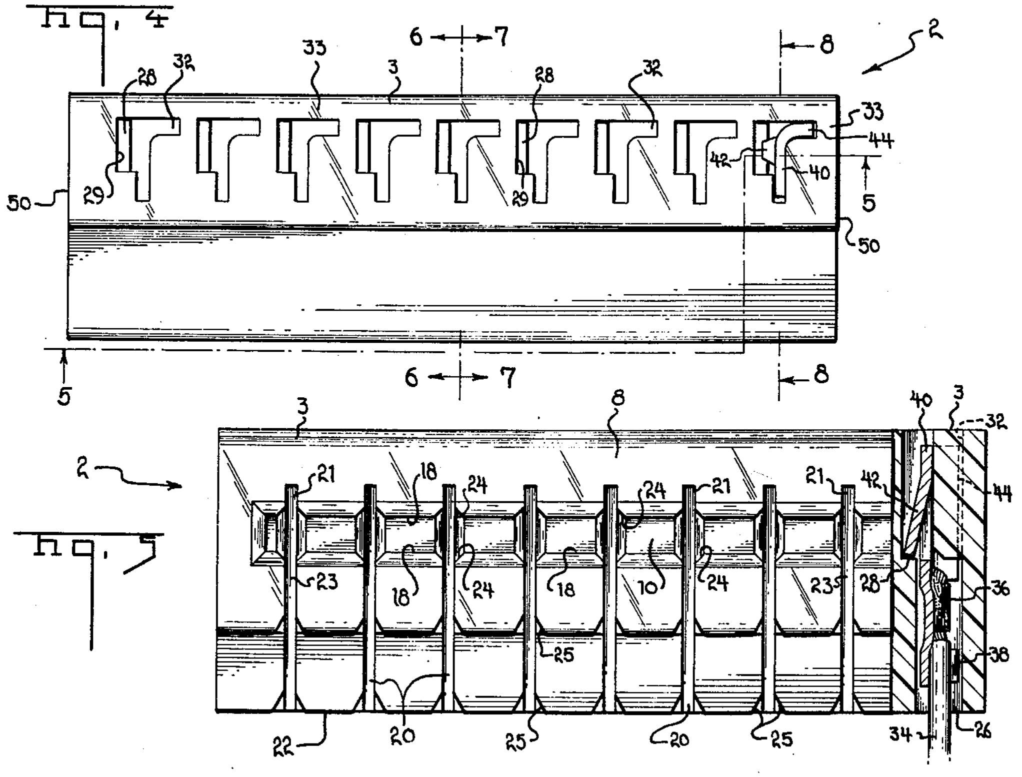
FIGURE 4 is a top plan view of a connector block in accordance with the invention.
FIGURE 5 is a frontal view of the block.
Figure 6:
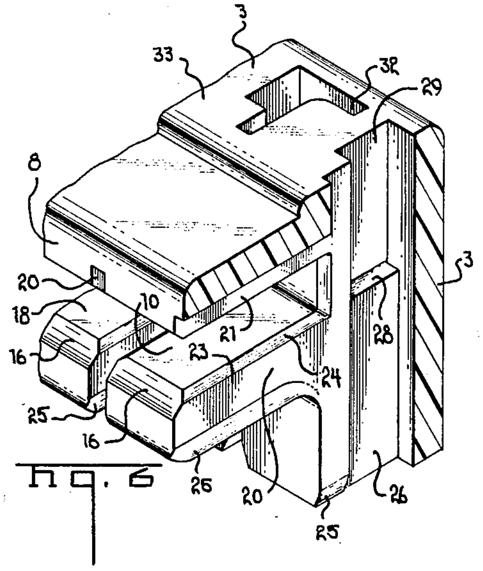
Figure 7:
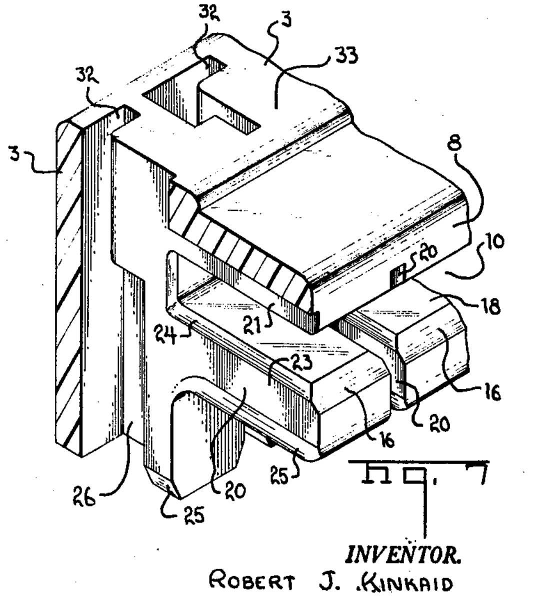

In the drawing, the reference numeral 2 denotes generally a connector in accordance with the invention which is adapted to be assembled to, and engaged with, an edge portion of a printed circuit board 4 having conductors 6 thereon which extend to the edge of the board. The connector comprises a dielectric block 3 of nylon or other suitable moldable material having a trough 10 in one side 8. This trough is adapted to receive the edge portions of the printed circuit board which lie between notches 12, 14, the sidewalls 18 of the trough being substantially parallel to each other and spaced apart by a distance slightly greater than the thickness of the board. Advantageously, the edges of the trough (the intersection of the sidewalls and the surface 8) are beveled as shown at 16 to facilitate the insertion of the edge of the board into the trough. It will be noted that the notch 14 is of a width slightly greater than that of notch 12 and that the wall portion 15 at the end of the trough is of a thickness slightly greater than that of the wall portion 13. This arrangement polarizes the connector block with reference to the board so that the parts can be assembled only in the proper and intended manner. Obviously, alternative polarizing schemes might be used as are known to the art.

A plurality of slots 20 are provided in the block and extend inwardly thereof from the side 8 and from an adjacent side 22. These slots should have a depth as measured from the side 8 which is at least equal to the depth of the trough 10, the depth of these slots in the disclosed embodiment being somewhat greater than the depth of the trough in order to accommodate the particular terminal of FIGURE 3 in a manner described below. The slots intersect the trough 10 so that at spaced locations along the length of the trough there are provided lateral recesses 21, 23 extending from the sidewalls 18. Advantageously, the intersections of these lateral recesses with the sidewalls of the trough and the edges of the slots on surface 22 are beveled as shown at 24 and 25 to facilitate assembly of the terminals or contacts to the block. The root portions of the slots which enter from the side 22 are enlarged as shown at 26 (FIGURES 6 and 7) and a shoulder 28, facing in the direction opposite from the side 22 of the block, is provided in the root portion of each slot for engagement with a tang on an inserted terminal. On the top side 33 of the block, this shoulder forms an enlarged cavity 29 into which a tool can be inserted to facilitate removal of individual contacts as is explained below. In the disclosed embodiment there is provided a lateral extension 32 on the root of each slot which receives a portion of the terminal with which the disclosed embodiment is intended to be used.

The particular terminal intended for usage with the disclosed embodiment of the block as shown in FIGURES 3 and 3A comprises a web portion 40 having an insulation crimp 38 and a wire barrel crimp 36 extending from one edge thereof, the wire barrel crimp portion being in crimped engagement with the conducting strands of a wire 34 and the insulation support crimp being in crimped engagement with the insulation of the wire. A tang 42 is struck out from the web 40 and a pair of contact arms 46 having enlarged ends 48 extend laterally and obliquely from an edge which is adjacent to the crimp portions, these arms being spaced apart by a distance slightly less than the width of the trough 10. A flange 44 extends along the opposite side of the web from the arms 46.

It will be noted that in the disclosed embodiment, the lower portion of the side 8 of the block is recessed with respect to the upper portion so that the block has a generally L-shaped cross section. It will also be apparent from the drawing that the upper side 33 has a low shoulder running lengthwise. These features of the invention are provided primarily in the interest of good molding practice and are not related to the functional features of the invention.

In normal usage, the conductors intended for the external connections for the printed circuit board 4 will be provided with terminals of the type shown in FIGURE 3 and will then be inserted into the block from the side 22 until the tang 42 lodges against the shoulder 28. These terminals can be inserted into the block only if they are properly aligned with the flange 44 in alignment with the extension 32 of the root of the slot. After the terminals have been thus inserted, their enlarged end portions 48 will project partially into the trough 10 as shown in FIGURE 2 so that when the block is assembled to the board 4, these contact arms will be spread apart by the board and by the conductor 6 thereon. The particular type of terminal shown is capable of making contact with conducting paths on both sides of the printed circuit board. This is a common expedient since quite frequently duplicate circuits are provided on opposite sides of the board, however, if desired only one of these contact arms can be utilized for making contact with a conductor on only one side of a board. An individual contact can be removed from the block by merely inserting a blade into opening 29 and depressing tank 42 so that it clears shoulder 28.

Connectors in accordance with the invention offer several advantages over prior art types of connectors intended for the same general function. In the first place, the invention provides a relatively simple connector assembly in which the terminals or contacts can be inserted into the connector block 3 or removed from the block with relative ease. A further advantage is that the external conductors 34 extend from the block normally of the plane of the printed circuit board 4 and this arrangement is desirable if not essential in many applications where printed circuit boards are used. A still further advantage of the invention is that when it is desired to remove the connector block from the board, there is absolutely no temptation on the part of the technician to grasp the wires 34 and pull upon them in order to effect such removal since the block could not, in fact, be removed from the board in this manner. The block can, however, conveniently be removed by grasping it on its opposite ends 50 and pulling it from the board. The possibility of damaging the block, the board, or the contacts by misuse in assembling or disassembling is substantially reduced as compared to the prior art devices in which the wires extend from the block in the same plane as the printed circuit board.

A further advantage of the disclosed embodiment is that the individual terminals or contacts have a limited amount of "float" with respect to the block so that upon insertion of the panel-like member they can be displaced to conform to any irregularities in its surface. Printed circuit boards are ideally perfectly flat and ordinarily it should not be necessary to provide float in the contacts, however, as a practical matter the boards may become warped during manufacture or during the assembly of electronic components thereto. If a board does become warped it will, upon insertion into the trough 10, cam some of the terminals upwardly or downwardly and cause them to accommodate themselves to the board's curvature. It is apparent from FIGURE 8 that limited movement of the terminals with respect to the slots can take place to achieve such conformity to the board.

As previously mentioned, the invention is adaptable to usage in environments other than that shown in the drawing. For example, the invention can be used for making disengageable electrical connections with tape cable or with panels having flat conductors thereon which are similar to conventional printed circuit panels.

Changes in construction will occur to those skilled in the art and various apparently different modifications and embodiments may be made without departing from the scope of the invention. The matter set forth in the foregoing description and accompanying drawings is offered by way of illustration only.

I claim:

1. An electrical connecting means for connecting the conducting paths on a panel-like member with wires external to said panel-like member comprising, a dielectric block having a trough extending along one side thereof, an edge portion of said panel-like member being received within said trough, said block having a plurality of slots, each slot extending inwardly from the edge formed by the intersection of said one side and an adjacent side, each of said slots intersecting said trough, at least some of said slots having disposed therein electrical terminals having contact portions extending on at least one side of said trough and in engagement with a conductor path on said panel-like member, conductors secured to said terminals and extending from said adjacent side of said block and normally of the plane of said panel-like member.

2. A connector for connecting lead wires to conductors on a panel-like member comprising, a dielectric block having a trough on one side thereof for reception of at least a portion of the edge of said panel-like member, a plurality of slots extending inwardly of said block from the edge formed by the intersection of said one side and an adjacent side, said slots intersecting at least one of the sidewalls of said trough, at least some of said slots having flag-type electrical terminals therein, each of said terminals having a contact portion extending substantially parallel to the opposed sidewalls of said trough towards said one side at least partially into said trough and thereby extending to make contact with said panel-like member upon insertion thereof into said trough, and each terminal being secured to a wire extending transversely of said contact portion, said wire extending from said adjacent side of said block, and means in said block for holding each of said terminals in its respective slot.

3. A disengageable connector assembly for connecting a plurality of lead wires with a panel-like member having conductors thereon comprising, a dielectric block having a trough extending along one side thereof for reception of said panel-like member, a plurality of slots in said block extending transversely of, and intersecting, said trough, each of said slots extending inwardly of said block from the edge formed by the intersection of said one side and an adjacent side, at least some of said slots having electrical terminals therein, said terminals each being secured to a wire and having arms extending laterally of the axis of said wire, said arms being spaced apart by a distance slightly less than the width of said trough, said terminals each being disposed in its respective slot with its arms extending parallel to the sidewalls of said trough and with its attached wire extending from said adjacent side.

4. Apparatus as set forth in claim 3 wherein said slots have enlarged root portions extending inwardly of said adjacent side for said wire and for the portions of said terminal which are secured to said wire.

5. Apparatus as set forth in claim 3 including shoulder means in each of said slots facing in the direction opposite to said adjacent side, each of said terminals having a tang in abutting relationship to said shoulder to retain said terminal within said slot.

6. A disengageable connector assembly for connecting a plurality of lead wires with a panel-like member having conductors thereon comprising, a dielectric block having a trough extending along one side thereof for reception of said panel-like member, a plurality of slots in said block extending transversely of, and intersecting, said trough, each of said slots extending inwardly of said block from the edge formed by the intersection of said one side and an adjacent side, said slots each having an enlarged root portion extending inwardly from said adjacent side and having a shoulder in said root portion facing in a direction opposite to said adjacent side, at least some of said slots having terminals therein, said terminals being secured to wires and each having a tang in engagement with said shoulder thereby to retain each terminal in its respective slot, each of said terminals having a pair of contact arms extending towards said one side and partially into said trough whereby, upon insertion of said panel-like member into said troughs, said arms are spread apart and are maintained in engagement with conductors on the surface of said panel.

7. A disengageable connecting device for connecting a plurality of lead wires to a panel-like member having conductors thereon comprising, a dielectric block having a trough extending along one side thereof for reception of an edge portion of said panel-like member, a plurality of slots extending transversely of the longitudinal axis of said trough, said slots extending inwardly from the edge formed by the intersection of said one side and an adjacent side, said slots intersecting said trough, each of said slots having an internal shoulder extending parallel to, and facing in the opposite direction to, said adjacent side whereby, upon insertion of a flag type terminal having spaced apart laterally extending contact arms and a resilient protuberance into one of said slots, said resilient protuberance latches said terminal in said slot with said arms extending along the sidewalls of said trough, and said arms establish electrical contact with said panel-like member upon insertion thereof into said trough.

8. A disengageable connecting device for connecting a plurality of lead wires to a panel-like member having conductors thereon comprising, a dielectric block having a trough extending along one side thereof for reception of said panel-like member, a plurality of slots in said block extending substantially transversely of, and intersecting, said trough, said slots extending inwardly of said block from the edge formed by the intersection of said one side and an adjacent side, said slots having enlarged root portions extending inwardly from said adjacent side, and a shoulder in said enlarged root portions facing in the direction opposite to said adjacent side whereby, upon insertion of a flag-type terminal having laterally projecting arm means and a resilient locking tang into one of said slots from said adjacent side, said tang lodges behind said shoulder to hold said connector in said slot with said arm means extending towards said one side and at least partially into said slot, said arm means being thereby engageable with said panel-like member to establish electrical contact therewith.

9. An electrical terminal for use in an edge connector for a panel-like member comprising, a substantially flat web having a pair of contact arms extending from one edge thereof, an adjacent edge of said web having a generally U-shaped extension thereon for reception of, and crimping onto, a wire, said web, said arms, and at least the base portion of said extension being substantially coplanar, a tang struck out from said web and extending obliquely thereof, and a flange on said web on the opposite side thereof from said arms, said flange extending angularly of the plane of said web.

10. A disengageable connecting device for connecting a plurality of lead wires to a panel-like member having conductors thereon comprising, a dielectric block having a trough extending along one side thereof for reception of at least a portion of an edge of said panel-like member, a plurality of relatively narrow slots extending inwardly of said block from said one side and from a side adjacent to said one side, said slots intersecting the edge formed by said one side and said adjacent side, said slots having a depth, as measured from said one side, which is at least equal to the depth of said trough, said slots extending transversely of the longitudinal axis of, and intersecting, said trough, each of said slots having shoulder means therein facing in a direction opposite from said adjacent side, whereby flag type terminals having laterally extending arms can be inserted into said slots from said adjacent side to position said arms on the sides of said trough, said shoulder means being cooperable with tangs on said terminals to retain said terminals in said slots.

References Cited in the file of this patent

UNITED STATES PATENTS

| | | |
|---|---|---|
| 2,829,359 | Ritter | Apr. 1, 1958 |
| 2,882,512 | Morone | Apr. 14, 1959 |
| 2,888,662 | Hammell | May 26, 1959 |
| 2,911,609 | Burtt et al. | Nov. 3, 1959 |
| 2,911,610 | Kirk | Nov. 3, 1959 |
| 2,928,063 | Gammel | Mar. 8, 1960 |

OTHER REFERENCES

Buggie Catalog, Jan. 8, 1954, page 2.

Disclaimer 3,075,167.—*Robert J. Kinkaid*, Harrisburg, Pa. PANEL CONNECTOR WITH FLAG-TYPE TERMINALS. Patent dated Jan. 22, 1963. Disclaimer filed Mar. 19, 1969, by the assignee, *AMP Incorporated*.

Hereby enters this disclaimer to claims 1 and 2 of said patent.

[*Official Gazette May 20, 1969.*]